United States Patent [19]

Essig et al.

[11] Patent Number: 5,660,914

[45] Date of Patent: Aug. 26, 1997

[54] FABRIC MATERIAL

[76] Inventors: Mitchell N. Essig, 227 High Brook Ct., Pelham, N.Y. 10803; Peter J. Wilk, 185 W. End Ave., New York, N.Y. 10023

[21] Appl. No.: 205,584

[22] Filed: Mar. 3, 1994

[51] Int. Cl.[6] .................. A41D 13/00; B32B 5/08; B32B 5/12

[52] U.S. Cl. .................. 428/110; 2/243.1; 428/111; 428/902

[58] Field of Search .................. 428/110, 239, 428/111, 247, 286, 902; 2/2, 243.1

[56] References Cited

U.S. PATENT DOCUMENTS

| | | | |
|---|---|---|---|
| 80,263 | 7/1868 | Haywood | 428/239 |
| 292,187 | 1/1884 | Tyler | 428/239 |
| 1,991,464 | 2/1935 | Mellerio | 428/239 |
| 3,682,755 | 8/1972 | Lee | 428/110 |
| 3,837,996 | 9/1974 | Brgun et al. | 428/239 |
| 4,001,472 | 1/1977 | Thomas et al. | 428/110 |
| 4,302,495 | 11/1981 | Marra | 428/110 |
| 4,467,005 | 8/1984 | Pusch et al. | 428/239 |
| 4,522,863 | 6/1985 | Keck et al. | 428/239 |

FOREIGN PATENT DOCUMENTS 1336201  11/1973  United Kingdom.

*Primary Examiner*—James C. Cannon
*Attorney, Agent, or Firm*—R. Neil Sudol; Henry D. Coleman

[57] ABSTRACT

A clothing material comprises a first fabric layer connected to a tear-resistant second layer. The second layer includes a plurality of first threads extending generally parallel to one another in a first direction and a plurality of second threads extending generally parallel to one another in a second direction different from the first direction. The threads all extend substantially in a common plane. The first threads are all connected to each of the second threads at cross-over points between the first threads and the second threads. A third layer of fabric is attached to the second layer of the material on a side thereof opposite the first layer. The threads of the intermediate, tear-resistant layer may be interconnected by a plurality of connecting thread segments tied in knots about the cross-over points.

4 Claims, 1 Drawing Sheet

FABRIC MATERIAL

BACKGROUND OF THE INVENTION

This invention relates to a fabric material. More particularly, this invention relates to a fabric material which is of special use in clothing.

It is well known that motorcycle riders generally wear leather for protecting the skin in the event of an accident. Problems with leather are its weight and its insulating qualities. Although fine for cold weather, leather has proven to be too warm for summer wear. Normal fabric materials, although lighter and cooler than leather, do not have the requisite protective capability. Normal fabrics tend to shred easily during the degrees of abrasion arising in vehicular accidents.

It has been proposed to use KEVLAR™ in motorcycle clothing. KEVLAR, however, suffers from the same problems as leather. It is heavy and hot in the summertime.

OBJECTS OF THE INVENTION

An object of the present invention is to provide an improved fabric material.

Another object of the present invention is to provide such a fabric material which is useful in manufacturing abrasion resistant clothing.

Another, more particular, object of the present invention is to provide such a fabric material which is relatively lightweight.

A further particular object of the present invention is to provide such a fabric material which is cool in summer weather.

These and other objects of the present invention will be apparent from the drawings and detailed descriptions herein.

SUMMARY OF THE INVENTION

A clothing material comprises, in accordance with the present invention, a first layer of fabric and a second layer attached to the first layer. The second layer includes a plurality of first threads extending generally parallel to one another in a first direction and a plurality of second threads extending generally parallel to one another in a second direction different from the first direction. The threads all extend substantially in a common plane. The first threads are all connected to each of the second threads at cross-over points between the first threads and the second threads. A third layer of fabric is attached to the second layer on a side thereof opposite the first layer.

According to another feature of the present invention, a plurality of connecting elements separately tie each of the first threads essentially to each of the second threads at the cross-over points.

Where the first layer of fabric is an outer layer, it is advantageous to make that layer of water resistant material.

It is contemplated that the connecting elements are thread segments tied in knots.

A fabric material in accordance with the present invention is light in weight and abrasion resistant. Accordingly, it is useful in manufacturing abrasion resistant clothing.

In addition, a fabric material in accordance with the present invention is not unduly warm in higher temperature climates.

DETAILED DESCRIPTION

Figure 3:
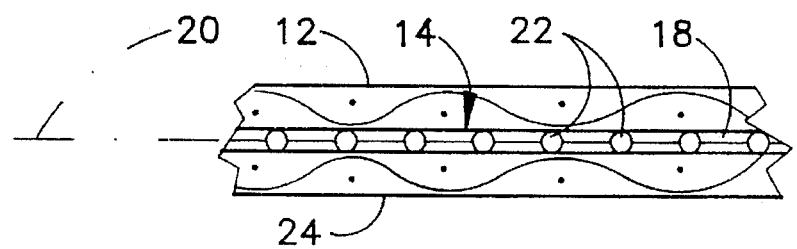
FIG. 3 is a schematic cross-sectional view of the fabric material of FIG. 1.
Figure 2:
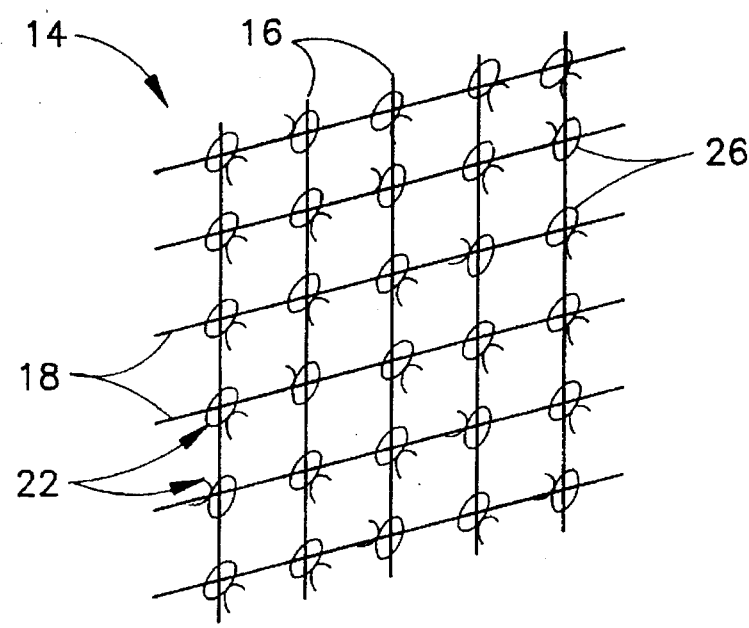
FIG. 2 is a schematic perspective view of a central or intermediate layer of the multi-layered material of FIG. 1.
Figure 1:
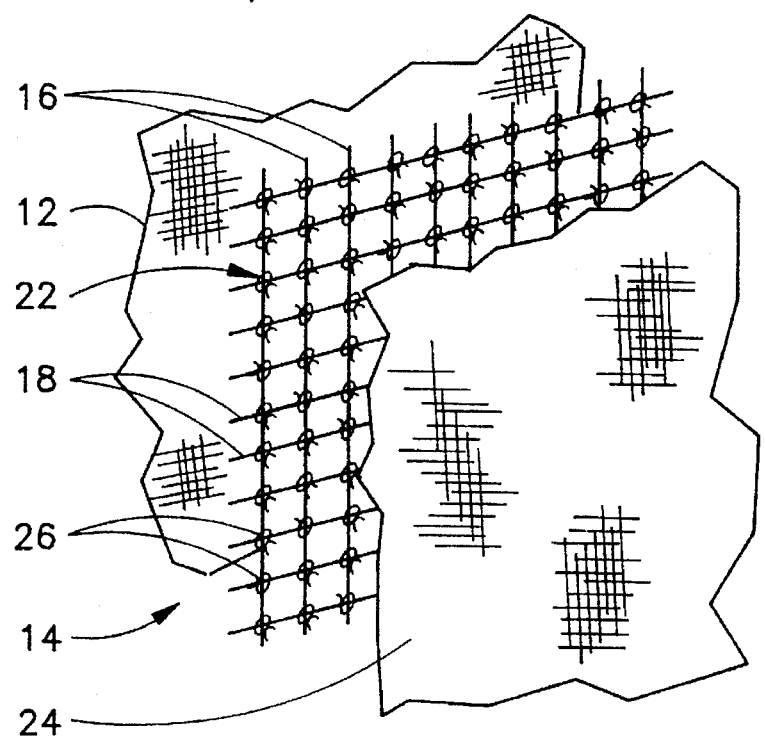
FIG. 1 is a schematic exploded view of a multi-layered fabric material in accordance with the present invention.

As illustrated in the drawings, a clothing material comprises a first fabric layer 12 and a second layer 14 attached to the first layer. Second layer 14 includes a plurality of first threads or strands 16 extending generally parallel to one another in a first direction and a plurality of second threads or strands 18 extending generally parallel to one another in a second direction different from the first direction. Threads 16 and 18 all extend substantially in a common plane 20. First threads 16 are all connected to each of the second threads 18 at cross-over points 22 between the first threads 16 and the second threads 18. A third fabric layer 24 is attached to second layer 14 on a side thereof opposite first fabric layer 12.

The connections of first threads 16 to second threads 18 in material layer 14 may be implemented in any number of equivalent ways. For example, if threads 16 and 18 are made of polymeric material, those threads may be bonded to one another by heat seals. The bonds may be formed, alternatively, by ultrasonic welding or by drops of adhesive.

In another connection technique, illustrated in the drawings, a plurality of connecting elements in the form of thread segments 26 tied in knots separately couple each first thread 16 essentially to each second thread 18 at the respective cross-over point 22. A material which may be used as the material of layer 14 is known as MARLEX™, which is in common use in the medical industry as an implant for closing internal perforations such as hernias.

Where first fabric layer 12 is an outer layer for an article of clothing such as a jacket or trousers, it is advantageous to make that layer of water resistant material. Inner layer 24 is then advantageously made of a soft, relative thick material. Layers 12 and 24 may be woven or nonwoven or knitted.

Intermediate layer 14 is the layer which provides tear-resistant strength to the fabric material. Threads 16 and 18 may be woven as weft and warp threads, respectively. Alternatively, threads 16 and 18 may be simply overlaid.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are preferred by way of example to facilitate comprehension of the invention and should not be construed to limit the scope thereof.

What is claimed is:

1. A clothing material comprising:

a first layer of fabric;

a second layer attached to said first layer, said second layer including:

a plurality of first threads extending generally parallel to one another in a first direction; and a plurality of second threads extending generally parallel to one another in a second direction different from said first direction, said second threads extending substantially in a common plane with said first threads, each of said first threads being connected to each of said second threads at cross-overpoints of said first threads and said second threads;

a third layer of fabric attached to said second layer on a side thereof opposite said first layer; and a plurality of connecting elements separately tying each of said first threads essentially to each of said second threads at said cross-over points.

2. The clothing material defined in claim 1 wherein said first layer of fabric is an outer layer and made of water resistant material.

3. The clothing material defined in claim 2 wherein said connecting elements are thread segments tied in knots.

4. The clothing material defined in claim 1 wherein said connecting elements are thread segments tied in knots.

* * * * *